United States Patent [19]

Usui

[11] Patent Number: 5,287,621
[45] Date of Patent: Feb. 22, 1994

[54] CYLINDER LINER MANUFACTURING PROCESS

[75] Inventor: Masayoshi Usui, Numazu, Japan

[73] Assignee: Usui Kokusai Sangyo Kaisha Ltd., Japan

[21] Appl. No.: 12,034

[22] Filed: Feb. 1, 1993

[30] Foreign Application Priority Data

Feb. 12, 1992 [JP] Japan ................................. 4-58901

[51] Int. Cl.$^5$ ............................................. B23P 15/00
[52] U.S. Cl. ................... 29/888.061; 29/523; 29/888.06
[58] Field of Search ............ 29/888.061, 523, 890.053, 29/890.054, 888.06, 445; 123/193.2

[56] References Cited

U.S. PATENT DOCUMENTS

| | | | |
|---|---|---|---|
| 1,814,267 | 7/1931 | Swartz | 29/888.061 |
| 2,283,424 | 5/1942 | Colwell et al. | 29/888.061 |
| 2,412,587 | 12/1946 | Larson | 29/888.061 |
| 2,575,938 | 11/1951 | Brenneke | 29/888.061 |
| 2,903,309 | 9/1959 | Brand | 29/888.061 |
| 4,986,230 | 1/1991 | Panyard et al. | 29/888.061 |
| 5,050,547 | 9/1991 | Takahashi | 29/888.061 |

*Primary Examiner*—Irene Cuda
*Attorney, Agent, or Firm*—Anthony J. Casella; Gerald E. Hespos

[57] ABSTRACT

A cylinder manufacturing process including the steps of: pressing an annular member of steel onto the outer circumference of one end of a cylindrical tube, which is made of steel and cut to a desired length in advance, and soldering it with a metal solder to form a flange wall; inserting the cylindrical tube portion into that portion of a mold, which has an internal diameter slightly larger than the external diameter of the tube; pressing the tube radially, while being set by fixing the flange wall, to increase the diameter of the tube with a plug which is made movable while being fitted therein and which has a slightly larger diameter than the internal diameter of the tube; and finishing the other end of the tube to product sizes.

8 Claims, 1 Drawing Sheet

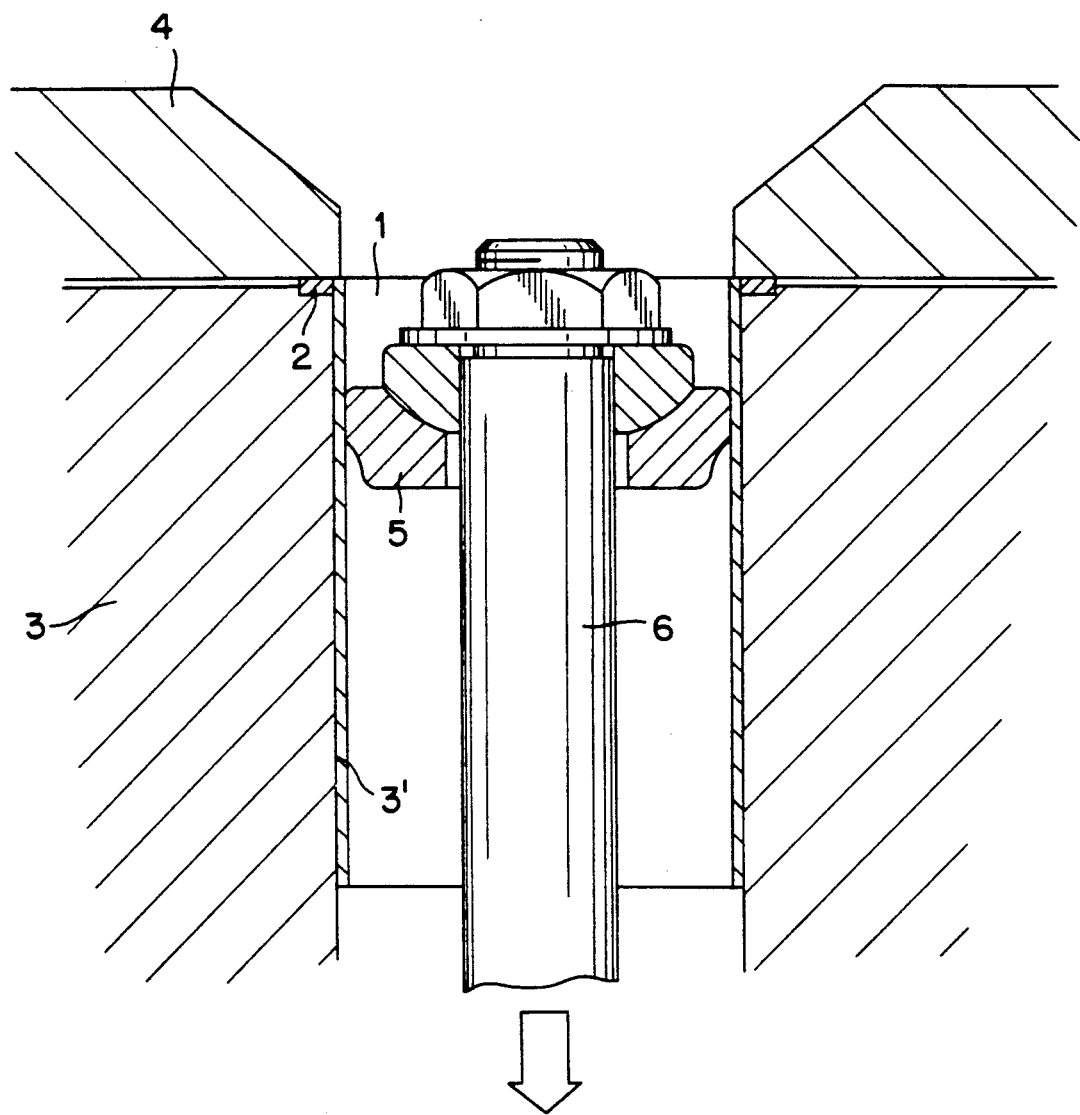

CYLINDER LINER MANUFACTURING PROCESS

BACKGROUND OF THE INVENTION

1. Field of the Invention

The present invention relates generally to a process for manufacturing a cylinder liner forming the sliding wall of a piston in an internal combustion engine.

2. Description of the Prior Art

In a manufacturing process of this kind of the prior art, a thick cylinder is prepared of cast iron by a centrifugal casting method and is largely cut at its inner and outer circumferences-and at its end faces to form the cylinder and a flange wall on the outer circumferential portion at its one end. In another method using a steel pipe, the cylindrical tube is formed with the flange wall by folding one end of the tube outward.

In the former method of the prior art, however, a substantial material is cut at the inner and outer circumferences and so on to invite a drop of the yield, and there arises a problem of deteriorating the productivity. In the latter method, on the other hand, the width of the flange wall cannot be enlarged because the flange wall is formed by folding the cylinder outward, and the thickness is smaller at the flange wall than at the cylindrical tube body so that the flange wall has a tendency to have an insufficient mechanical strength. At the same time, the flange wall obtained is insufficient due to the fine cracking in the circumference thereof. Moreover, the cylindrical tube is liable to be bent inward at the folded portion or in the vicinity of the inner circumference of the cylindrical tube. This raises a problem that the portion in the vicinity of the inner circumferential portion has a tendency of being thinned by the subsequent honing step.

SUMMARY OF THE INVENTION

The present invention has been conceived in view of the above-specified problems intrinsic to the prior art and has an object to provide a cylinder liner manufacturing process which has excellent production yield and productivity of material by eliminating or minimizing the cutting step and which is enabled to easily manufacture a highly precise product having an excellent surface roughness on the inner circumference by increasing the diameter by means of a plug.

In order to achieve the above-specified object, according to the present invention, there is provided a cylinder manufacturing process which comprises the steps of: pressing an annular member of steel onto the outer circumference of one end of a cylindrical tube, which is made of steel and cut to a desired length in advance, and soldering it with a metal solder to form a flange wall; inserting the cylindrical tube portion into that portion of a mold, which has an internal diameter slightly larger than the external diameter of the tube; pressing the tube radially, while being set by fixing the flange wall, to increase the diameter of the tube with a flange which is made movable while being fitted therein and which has a slightly larger diameter than the internal diameter of the tube; and finishing the other end of the tube. The finishing step is a plasticizing step or a cutting step. The cylindrical tube is made of a carbon steel material for a cylindrical tube, a mechanical tube or a pressure piping tube. The metal solder is made of copper, bronze, brass or silver. The tube portion is either plated at its inner circumference with porous chromium or honed after the finishing step.

According to the present invention, the flange wall is formed by soldering the separate annular member to the cylindrical tube. Thus, the cutting step can be eliminated or minimized to improve the yield of the material and the productivity. The product having an excellent surface roughness on the inner circumference and an excellent precision can be manufactured by radially pushing the plug which moves which is made movable while being fitted therein, and the sufficient flange width and thickness provide high mechanical strength and reliability.

BRIEF DESCRIPTION OF THE DRAWING

The accompanying drawing presents a section for explaining a method of the present invention.

DETAILED DESCRIPTION OF THE INVENTION

An embodiment of the present invention will be described in the following. A cylindrical tube 1 of a piping material of carbon steel STC38 for cylinder tubes is cut to have an external diameter of 100 Mm, a thickness of 1.6 mm and a product length of 240 Mm. Onto the outer circumference at one end of the cylindrical tube 1, there is pressed an annular member of the same steel or rolled steel, which has an external diameter of 110 mm, an internal diameter of 100 Mm and a thickness of 2.3 mm. After this, the annular member is soldered with a copper solder in a furnace of reducing gases to form a flange wall 2. Next, the cylindrical tube portion is inserted into the internal diameter portion 3' of a mold having an internal diameter of 101 mm and a depth of 280 mm. In the state wherein the flange wall is fixed and set from the outside by means of a retainer 4, a cemented plug 5 having an external diameter of 98.0 mm is fitted therein and is axially moved by pulling its rod 6. As a result, the cylindrical tube portion is radially pressed and increased by the plug into a tube having an external diameter 101 mm and an internal diameter of 98 Mm. Then, this tube is finished by a plasticizing or cutting step to produce a liner having a flange diameter of 108 mm and a product length of 240 mm. After this, the tube portion may have its inner circumference subjected, if necessary, to a surface treatment such as a porous chromium plating and/or a honing treatment. In the embodiment thus far described, the cemented plug is moved by pulling it. It is, however, quite natural that the plug may be moved in one direction either by extruding it or by pulling and extruding it.

As has been described hereinbefore, the cylinder liner manufacturing process according to the present invention comprises the steps of: soldering the cylindrical tube and the flange wall; increasing the diameter of the cylindrical tube portion by pressing it in the mold in the radial direction of the plug; and finishing the other end of the tube and, if necessary, the flange wall to the product sizes. Thus, the cutting step can be eliminated or minimized to improve the yield of the material and the productivity. The product has an excellent precision in the surface roughness on the inner circumference enlarged by the plug can be easily manufactured and can be given high mechanical strength and reliability by the sufficient flange width and thickness. Thus, the cylinder liner manufacturing process according to the present invention is remarkably useful.

What is claimed is:

1. A cylinder manufacturing process comprising the steps of: providing a cylindrical steel tube having opposed ends, an outer circumference defining an initial external diameter and an inner circumference defining an initial internal diameter; pressing an annular member of steel onto the outer circumference of one said end of the cylindrical tube; soldering the annular member to the tube with a metal solder to form a flange wall; inserting the cylindrical tube into a mold which has an internal diameter slightly larger than the initial external diameter of said tube; fixing said flange wall externally on said mold; providing a plug which has a slightly larger diameter than the initial internal diameter of said tube; urging said plug through the tube for increasing the internal and external diameters of the tube; and finishing the end of said tube opposite the flange wall.

2. A cylinder liner manufacturing process according to claim 1, wherein said finishing step is a plasticizing step.

3. A cylinder liner manufacturing process according to claim 1, wherein said finishing step is a cutting step.

4. A cylinder liner manufacturing process according to claim 1, wherein said cylinder tube is made of a carbon steel tube material.

5. A cylinder liner manufacturing process according to claim 1, wherein said metal solder is selected from the group consisting of copper, bronze, brass and silver.

6. A cylinder liner manufacturing process according to claim 1, further comprising the step of providing the inner circumference of said tube with porous chromium after the finishing step.

7. A cylinder liner manufacturing process according to claim 1, wherein said plug is moved by pulling.

8. A cylinder liner manufacturing process according to claim 1, wherein said plug is moved by extrusion.

* * * * *